United States Patent
Zhu et al.

(10) Patent No.: US 9,835,813 B1
(45) Date of Patent: Dec. 5, 2017

(54) ASSEMBLY FOR INSTALLING OPTICAL FIBER CABLE

(71) Applicant: Amphenol Fiber Optic Technology (Shenzhen) Co., Ltd., Shenzhen, Guangdong Province (CN)

(72) Inventors: Linghua Zhu, Shenzhen (CN); Songsheng Li, Shenzhen (CN); Anh Nguyen, Shenzhen (CN); David Frey, Shenzhen (CN)

(73) Assignee: Amphenol Fiber Optic Technology (Shenzhen) Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 15/443,350

(22) Filed: Feb. 27, 2017

(30) Foreign Application Priority Data

Oct. 31, 2016 (TW) .............................. 105216553 U (51) Int. Cl.
*G02B 6/44* (2006.01)
*G02B 6/38* (2006.01)

(52) U.S. Cl.
CPC ......... *G02B 6/4432* (2013.01); *G02B 6/3894* (2013.01); *G02B 6/4465* (2013.01); *G02B 6/4471* (2013.01)

(58) Field of Classification Search
CPC .. G02B 6/4432; G02B 6/3894; G02B 6/4465; G02B 6/4471
See application file for complete search history.

(56) References Cited

U.S. PATENT DOCUMENTS

| | | | | |
|---|---|---|---|---|
| 7,565,053 B2 * | 7/2009 | Zimmel | ............... | G02B 6/3849 385/134 |
| 7,614,799 B2 * | 11/2009 | Bradley | ............... | G02B 6/3849 385/77 |
| 7,869,685 B2 * | 1/2011 | Hendrickson | ........ | G02B 6/3849 385/136 |
| 8,009,957 B2 * | 8/2011 | Utz | ...................... | G02B 6/4465 385/136 |
| 8,041,177 B2 * | 10/2011 | Zimmel | ............... | G02B 6/3849 385/134 |
| 8,303,193 B2 * | 11/2012 | Coleman | .............. | G02B 6/3887 385/80 |
| 8,465,212 B2 * | 6/2013 | Bradley | ............... | G02B 6/3849 385/136 |

(Continued)

FOREIGN PATENT DOCUMENTS

JP 58189602 A * 11/1983 ........... G02B 6/4465

*Primary Examiner* — Peter Radkowski
(74) *Attorney, Agent, or Firm* — Muncy, Geissler, Olds & Lowe, P.C.

(57) ABSTRACT

An assembly for installing an optical fiber cable which includes a fiber core assembly and a reinforcement yarn assembly surrounding the fiber core assembly. The assembly includes a leading unit having a yarn positioner for fixing a front part of the reinforcement yarn assembly, and a trailing unit including a front cap, a rear tube, and a middle tube that has front and rear threaded portions threadedly engage the front cap and the rear tube, respectively. The front cap has a threaded sleeve portion sleeving around the front threaded portion of the middle tube for clamping a rear part of the reinforcement yarn assembly against the middle tube, thereby fixing the rear part of the reinforcement yarn assembly.

5 Claims, 7 Drawing Sheets (56) References Cited

U.S. PATENT DOCUMENTS

| | | | | |
|---|---|---|---|---|
| 8,939,654 B2* | 1/2015 | Lu | .............. | G02B 6/38 |
| | | | | 385/60 |
| 9,052,469 B2* | 6/2015 | Bauco | .............. | G02B 6/3855 |
| 9,151,905 B2* | 10/2015 | Bauco | .............. | G02B 6/3855 |
| 9,291,780 B2* | 3/2016 | Lu | .............. | G02B 6/38 |
| 2008/0304804 A1* | 12/2008 | Zimmel | .............. | G02B 6/3849 |
| | | | | 385/139 |
| 2008/0317415 A1* | 12/2008 | Hendrickson | .............. | G02B 6/3849 |
| | | | | 385/77 |
| 2010/0074588 A1* | 3/2010 | Zimmel | .............. | G02B 6/3849 |
| | | | | 385/139 |
| 2010/0080525 A1* | 4/2010 | Coleman | .............. | G02B 6/3887 |
| | | | | 385/137 |
| 2010/0220969 A1* | 9/2010 | Utz | .............. | G02B 6/4465 |
| | | | | 385/136 |
| 2011/0170829 A1* | 7/2011 | Bradley | .............. | G02B 6/3849 |
| | | | | 385/77 |
| 2014/0086534 A1* | 3/2014 | Lu | .............. | G02B 6/38 |
| | | | | 385/60 |
| 2014/0161395 A1* | 6/2014 | Klavuhn | .............. | G02B 6/3887 |
| | | | | 385/81 |
| 2014/0321812 A1* | 10/2014 | Bauco | .............. | G02B 6/3855 |
| | | | | 385/78 |
| 2014/0341511 A1* | 11/2014 | Daems | .............. | G02B 6/3809 |
| | | | | 385/77 |
| 2015/0241638 A1* | 8/2015 | Bauco | .............. | G02B 6/3855 |
| | | | | 216/24 |
| 2015/0241639 A1* | 8/2015 | Lu | .............. | G02B 6/38 |
| | | | | 385/139 |
| 2016/0334587 A1* | 11/2016 | Isenhour | .............. | G02B 6/3887 |

* cited by examiner

ASSEMBLY FOR INSTALLING OPTICAL FIBER CABLE

CROSS-REFERENCE TO RELATED APPLICATION

This application claims priority of Taiwanese Patent Application No. 105216553, filed on Oct. 31, 2016.

FIELD

The disclosure relates to an assembly for installing an optical fiber cable.

BACKGROUND

Figure 1:
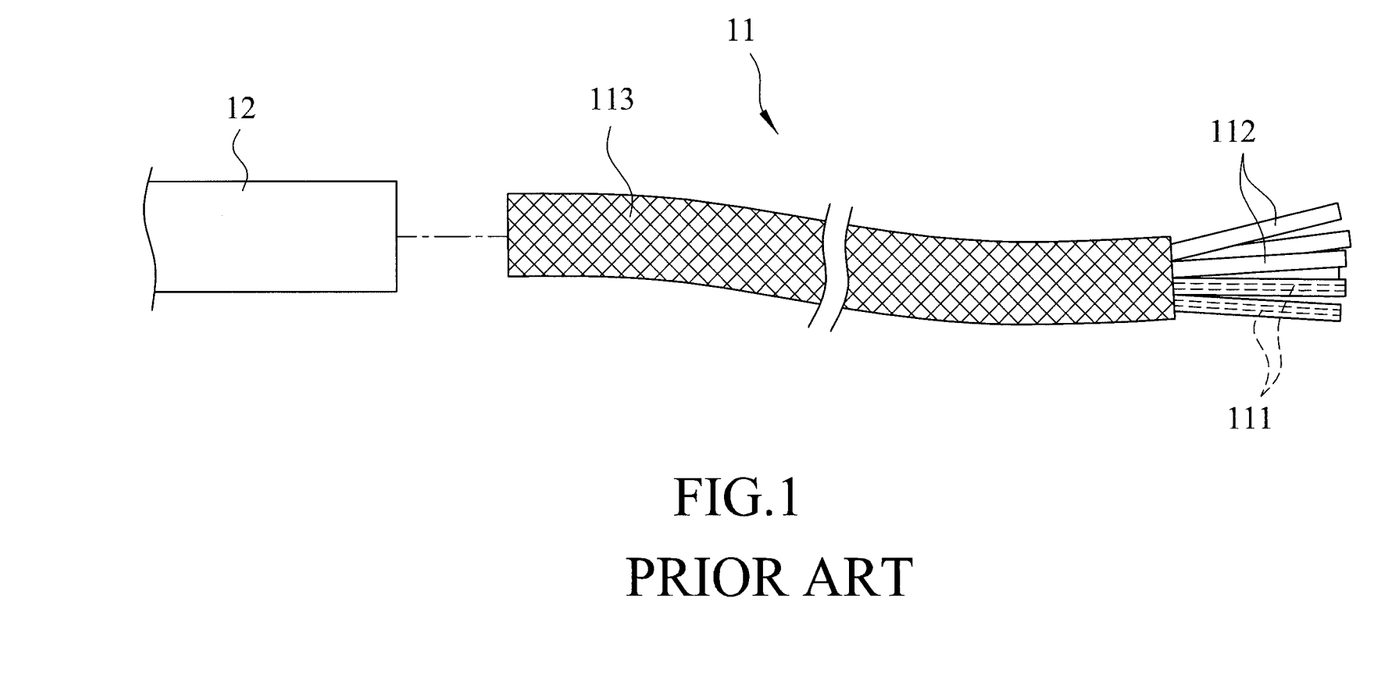
FIG. 1 is a fragmentary schematic view illustrating a conventional optical fiber cable and an installation tube.

Referring to FIG. 1, a conventional optical fiber cable 11 includes a plurality of optical fibers 111 arranged in a bundle, a plurality of plastic protective tubings 112 respectively surrounding the optical fibers 111 for protecting the optical fibers 111, and a reinforcement yarn assembly 113 surrounding the protective tubings 112 and being elastic in a lengthwise direction of the optical fibers 111. For installing the conventional optical fiber cable 11 within a wall (not shown), an installation tube 12 is disposed in the wall to accommodate the conventional optical fiber cable 11 therein. The reinforcement yarn assembly 113 prevents damage to the protective tubings 112 when the conventional optical fiber cable 11 extends through the installation tube 12.

However, since the reinforcement yarn assembly 113 and the protective tubings 112 are not fixedly connected, and since the installation tube 12 may be long and winding for proper installation of the conventional optical fiber cable 11 in the wall, the conventional optical fiber cable 11 may have to be pushed or pulled multiple times before successfully extending through the installation tube 12, which may cause slippage of the reinforcement yarn assembly 113 relative to the optical fibers 111 and may result in exposure of end portions of the protective tubings 112 outside of the reinforcement yarn assembly 113. Such exposure may cause damage to the protective tubings 112 during installation, and may even cause damage to the optical fibers 111.

SUMMARY

Therefore, an object of the disclosure is to provide an assembly that can alleviate at least one of the drawbacks of the prior art.

According to the disclosure, the assembly is used for installing an optical fiber cable which includes a fiber core assembly and a reinforcement yarn assembly surrounding an outer surface of the fiber core assembly. The assembly of the disclosure includes a leading unit and a trailing unit.

The leading unit is configured to sleeve around a front end of the optical fiber cable, and has a yarn positioner for fixing and limiting a front part of the reinforcement yarn assembly from movements relative to the leading unit. The trailing unit is configured to be disposed at a rear of the leading unit along a lengthwise direction of the optical fiber cable, and including a middle tube, a rear tube, and a front cap. The middle tube defines a receiving space, and has opposite front and rear threaded portions extending frontward and rearward, respectively. The rear tube threadedly engages the rear threaded portion of the middle tube, and defines an accommodating space in spatial communication with the receiving space. The front cap has a cap portion, and a front crimp portion extending forward from the cap portion and configured to be fitted over the optical fiber cable. The cap portion has a threaded sleeve portion disposed oppositely of the front crimp portion and sleeving around the front threaded portion of the middle tube for clamping a rear part of the reinforcement yarn assembly against the front threaded portion of the middle tube. The receiving space and the accommodating space are adapted for receiving the fiber core assembly uncovered by the reinforcement yarn assembly.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
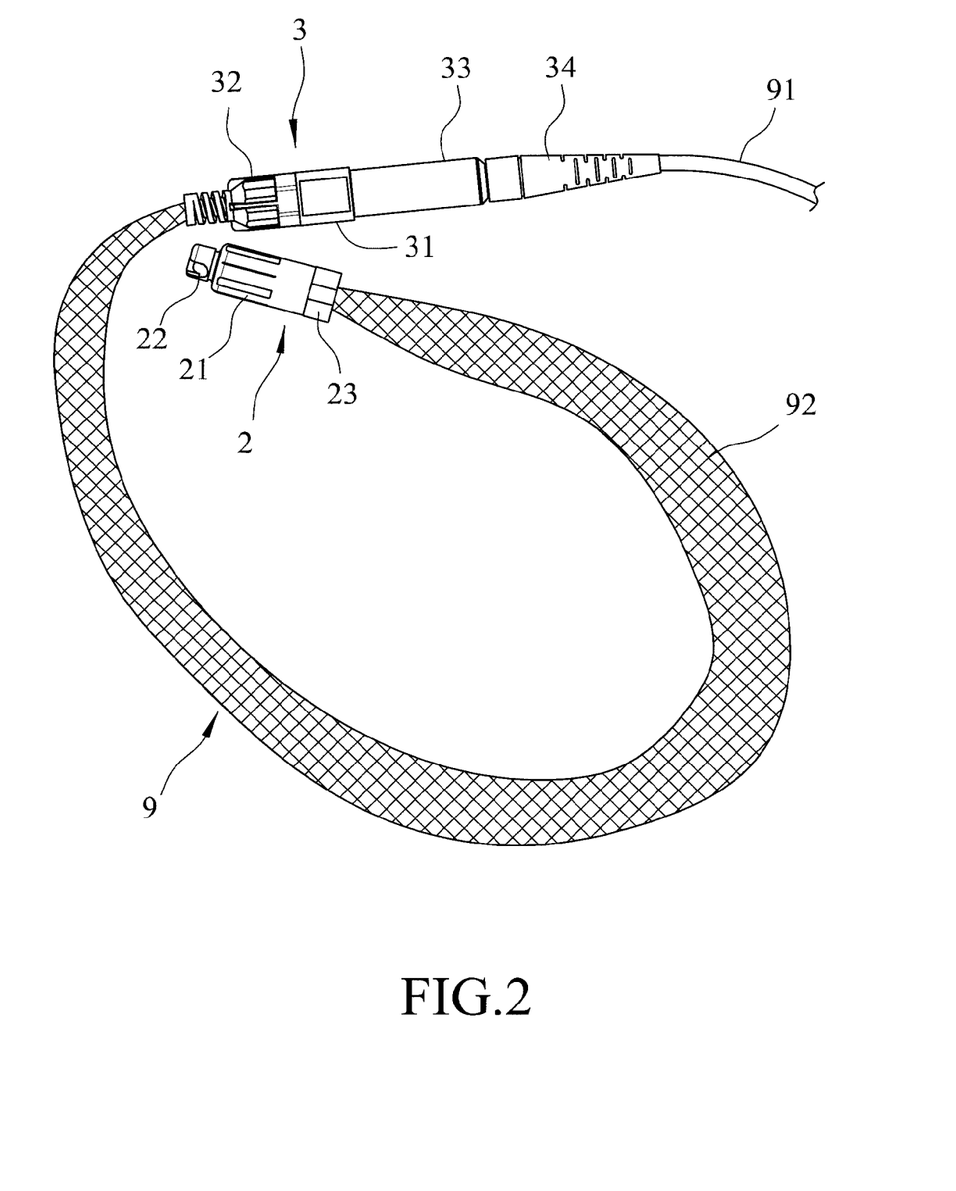
FIG. 2 is a fragmentary side view illustrating an embodiment of an assembly according to the disclosure and an optical fiber cable.

Referring to FIG. 2, an embodiment of an assembly according to the disclosure is used for installing an optical fiber cable 9. The optical fiber cable 9 includes a fiber core assembly 91 having a plurality of optical fibers that are respectively received in a plurality of rubber tubings and that are for fiber-optic communication, and a reinforcement yarn assembly 92 surrounding an outer surface of the fiber core assembly 91. The assembly of the disclosure includes a leading unit 2 and a trailing unit 3.

Figure 3:
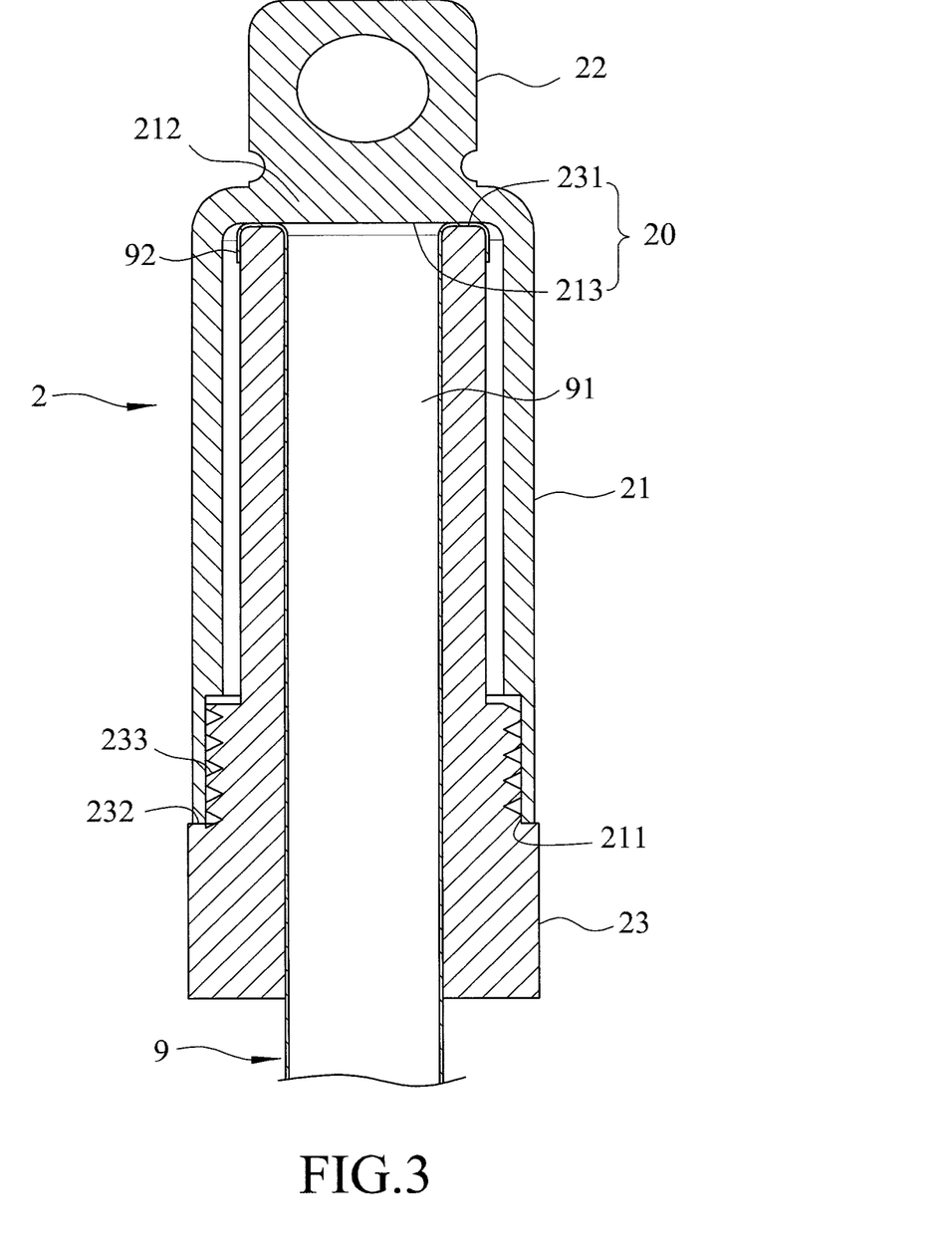
FIG. 3 is a fragmentary sectional view illustrating connection between a leading unit of the embodiment and the optical fiber cable.

With further reference to FIG. 3, the leading unit 2 is configured to sleeve around a front end of the optical fiber cable 9, and has a yarn positioner 20 for fixing and limiting a front part of the reinforcement yarn assembly 92 from movements relative to the leading unit 2. The leading unit 2 includes a pulling cap 21 and a tubular member 23.

The pulling cap 21 has a front closed end wall 212, and a rear open end 211 extending rearward. The tubular member 23 threadedly engages and is inserted into the pulling cap 21 through the rear open end 211 for receiving the front part of the optical fiber cable 9. The tubular member 23 has a front end 231 to abut an inner surface 213 of the front closed end wall 212 for clamping a front part of the reinforcement yarn assembly 92 against the inner surface 213 of the front closed end wall 212. The yarn positioner 20 includes the front end 231 of the tubular member 23 and the inner surface 213 of the front closed end wall 212.

In greater detail, the tubular member 23 further has a rear end portion 232 abutting against an end face of the rear open end 211 of the pulling cap 21, and a screw portion 233 engaging an inner surface 213 of the pulling cap 21 adjacent the end face of the rear open end 211. The pulling cap 21 further has a pull ring 22 that is integrally connected to the front closed end wall 212.

Figure 4:
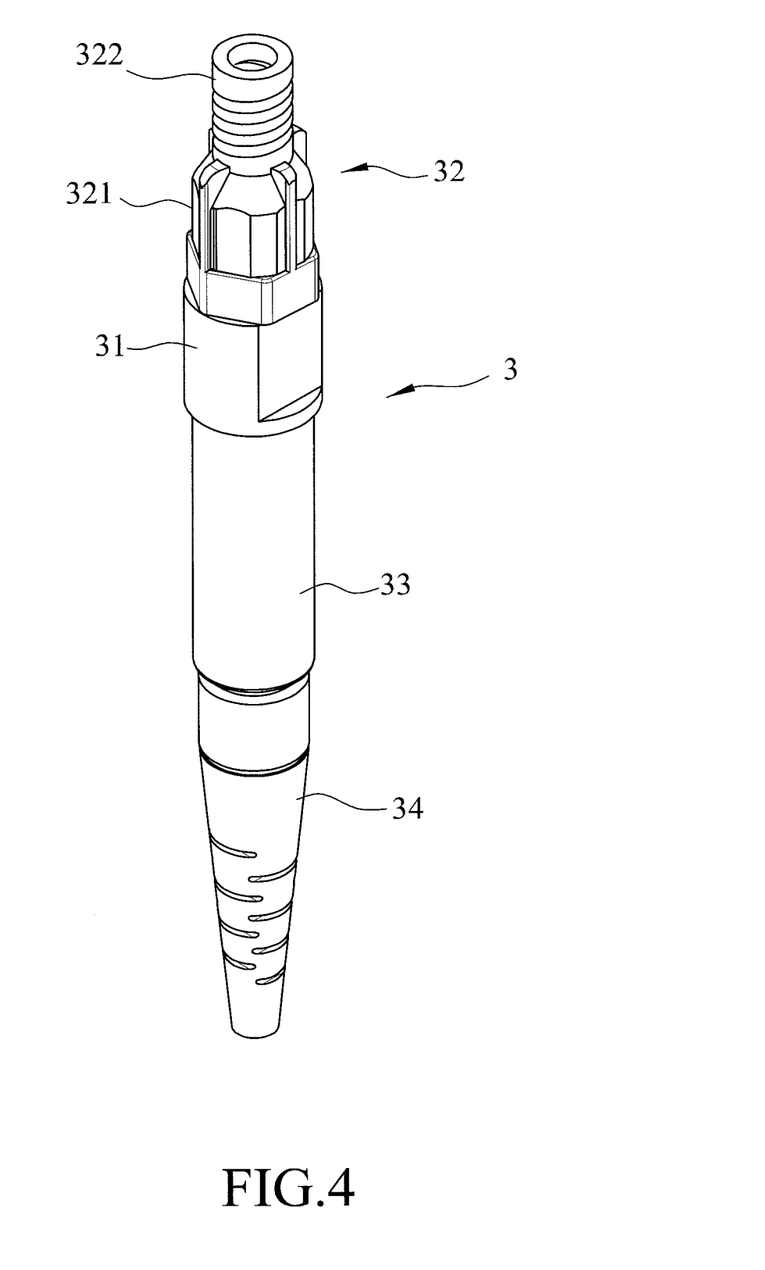
FIG. 4 is a perspective view illustrating a trailing unit of the embodiment.
Figure 5:
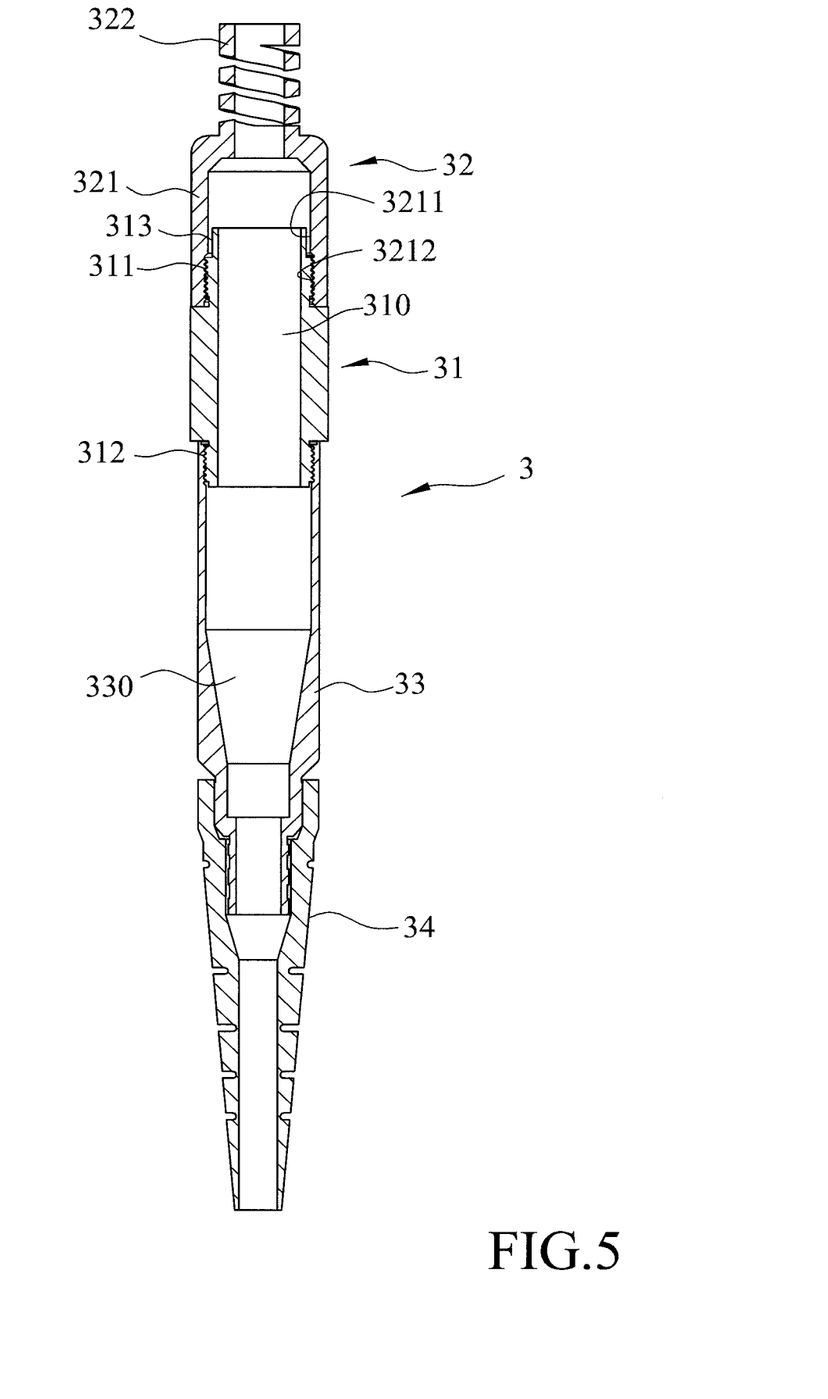
FIG. 5 is a sectional view of the trailing unit.

Referring to FIGS. 4 and 5, the trailing unit 3 is configured to be disposed at a rear of the leading unit 2 along a lengthwise direction of the optical fiber cable 9. The trailing unit 3 includes a middle tube 31, a rear tube 33, a front cap 32, and a boot 34.

The middle tube 31 defines a receiving space 310, and has opposite front and rear threaded portions 311, 312 respectively extending frontward and rearward, and a non-threaded front end portion 313 extending forwardly from the front threaded portion 311. Each of the front and rear threaded portions 311, 312 is formed with an external thread.

The rear tube 33 threadedly engages the rear threaded portion 312 of the middle tube 31, and defines an accommodating space 330 in spatial communication with the receiving space 310.

The front cap 32 has a hollow cap portion 321, and a front crimp portion 322 extending forward from the cap portion 321 and configured to be fitted over the optical fiber cable 9. The cap portion 321 has a non-threaded inner surface region 3211 and a threaded sleeve portion 3212. The non-threaded inner surface region 3211 faces the non-threaded front end portion 313 of the middle tube 31 for clamping the reinforcement yarn assembly 92 against the non-threaded front end portion 313. The threaded sleeve portion 3212 is disposed oppositely of the front crimp portion 322, and sleeves around the front threaded portion 311 of the middle tube 31 for clamping a rear part of the reinforcement yarn assembly 92 against the front threaded portion 311 of the middle tube 31. That is, the front threaded portion 311 of the middle tube 31 is formed with an external thread for engaging the reinforcement yarn assembly 92, and the threaded sleeve portion 3212 of the cap portion 321 is formed with an internal thread for engaging the reinforcement yarn assembly 92.

The boot 34 threadedly engages the rear tube 33 oppositely of the middle tube 31, and is configured to be fitted over the fiber core assembly 91.

Figure 6:
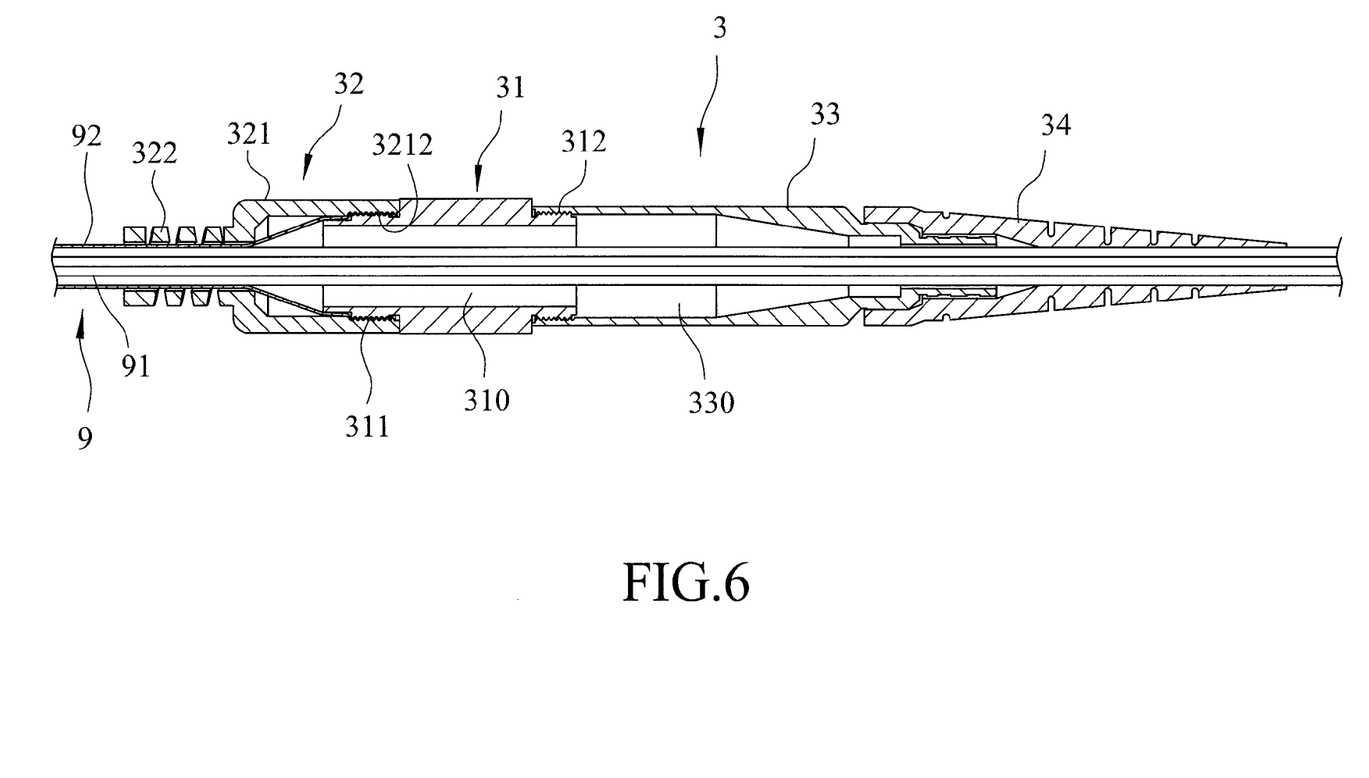
FIG. 6 is a schematic partly sectional view illustrating connection between the trailing unit of the embodiment and the optical fiber cable.
Figure 7:
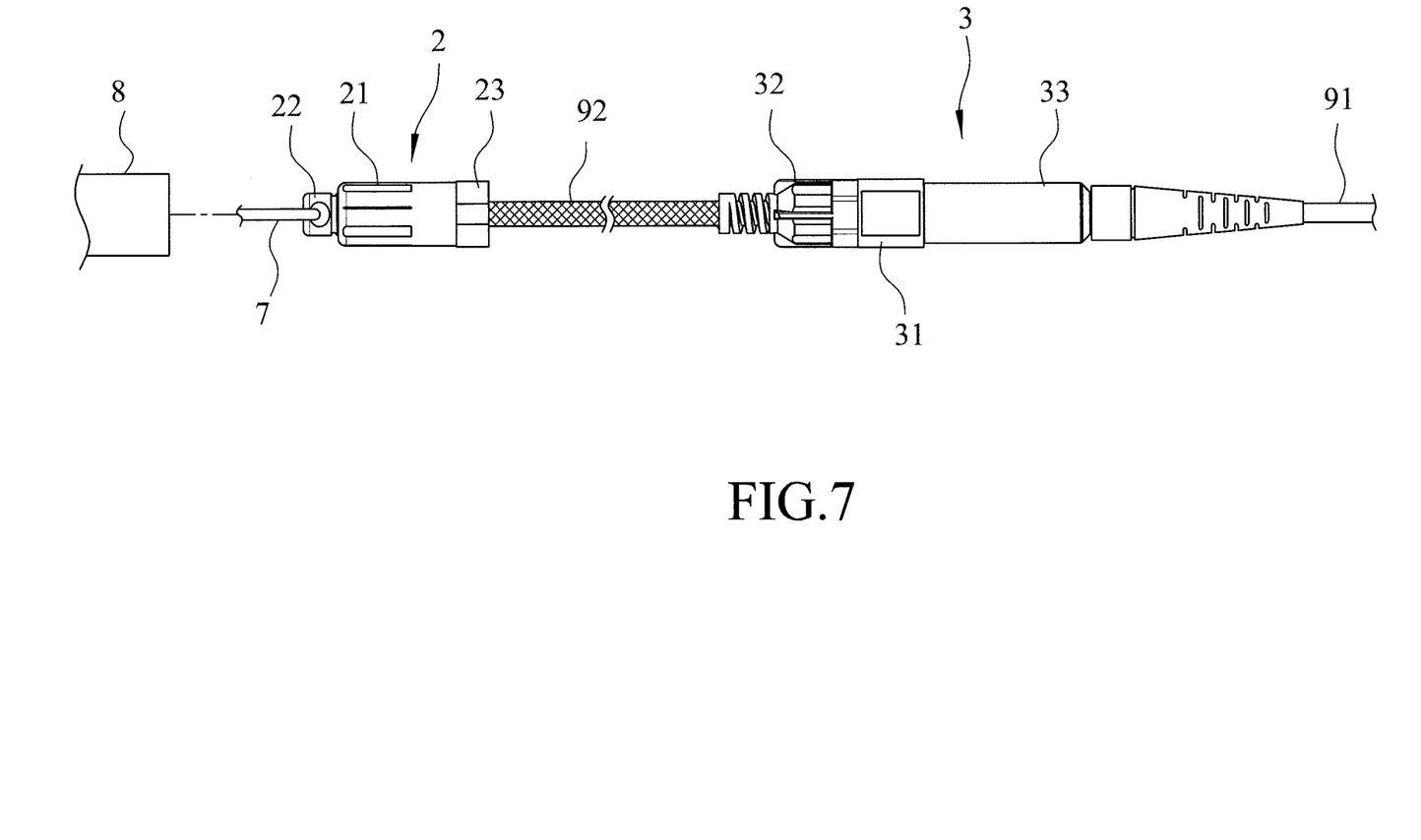
FIG. 7 is a fragmentary side view illustrating the assembly of the embodiment being used for installing the optical fiber cable.

Referring to FIGS. 3, 6, and 7, when it is desired to extend the optical fiber cable 9 through an installation tube 8 (see FIG. 7) for installing the optical fiber cable 9 within a wall (not shown), first the tubular member 23 of the leading unit 2 is sleeved on the front end of the optical fiber, and is inserted into and threadedly engages the pulling cap 21 so that the front part of the reinforcement yarn assembly 92 is fixed by the yarn positioner 20. Next, a rear part of the optical fiber cable 9 is extended through the middle tube 31 with the reinforcement yarn assembly 92 surrounding the front threaded portion 311 of the middle tube 31, such that the receiving space 310 and the accommodating space 330 receive the fiber core assembly 91 uncovered by the reinforcement yarn assembly 92. Afterwards, the threaded sleeve portion 3212 of the front cap 32 threadedly engages the front threaded portion 311 of the middle tube 31 with the reinforcement yarn assembly 92 being clamped therebetween so as to fix the rear part of the reinforcement yarn assembly 92.

For assisting the extension of the optical fiber cable 9 through the installation tube 8, a string 7 is tied to the pull ring 22 of the pulling cap 21 and extends through the installation tube 8 from an end thereof, and then the optical fiber cable 9 and the assembly of the disclosure can extend through the installation tube 8 simply by pulling the string 7 from an opposite end of the installation tube 8. By virtue of the leading and trailing units 2, 3 being fixedly connected to the reinforcement yarn assembly 92, slippage of the reinforcement yarn assembly 92 relative to the fiber core assembly 91 is effectively prevented during the installing process, thereby preventing friction contact between the fiber core assembly 91 and an inner surface of the installation tube 8 and protecting the fiber core assembly 91 from damage.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An assembly for installing an optical fiber cable including a fiber core assembly and a reinforcement yarn assembly that surrounds an outer surface of the fiber core assembly, said assembly comprising:
   a leading unit configured to sleeve around a front end of the optical fiber cable and having a yarn positioner for fixing and limiting a front part of the reinforcement yarn assembly from movements relative to said leading unit; and
   a trailing unit configured to be disposed at a rear of said leading unit along a lengthwise direction of the optical fiber cable, and including
   a middle tube which defines a receiving space, and which has opposite front and rear threaded portions extending frontward and rearward, respectively,
   a rear tube which threadedly engages said rear threaded portion of said middle tube and which defines an accommodating space in spatial communication with said receiving space, and
   a front cap which has a cap portion, and a front crimp portion extending forward from said cap portion and configured to be fitted over the optical fiber cable, said cap portion having a threaded sleeve portion disposed oppositely of said front crimp portion and sleeving around said front threaded portion of said middle tube for clamping a rear part of the reinforcement yarn assembly against said front threaded portion of said middle tube, said receiving space and said accommodating space being adapted for receiving the fiber core assembly that is uncovered by the reinforcement yarn assembly;
   wherein said leading unit includes a pulling cap that has a front closed end wall, and a rear open end extending rearward, and a tubular member threadedly engaging and inserted into said pulling cap through said rear open end for receiving the front part of the optical fiber cable, said tubular member having a front end to abut an inner surface of said front closed end wall for clamping a front part of the reinforcement yarn assembly against said inner surface of the front closed end wall, said yarn positioner including said front end of said tubular member and said inner surface of said front closed end wall; and wherein said tubular member further has a rear end portion abutting against an end face of said rear open end of said pulling cap, and a screw portion engaging an inner surface of said pulling cap adjacent said end face of said rear open end.

2. The assembly as claimed in claim 1, wherein said front threaded portion of said middle tube is formed with an external thread for engaging the reinforcement yarn assembly, said threaded sleeve portion of said cap portion being formed with an internal thread for engaging the reinforcement yarn assembly.

3. The assembly as claimed in claim 2, wherein said middle tube further has a non-threaded front end portion extending forwardly from said front threaded portion of said middle tube, said cap portion further has a non-threaded inner surface region facing said non-threaded front end portion for clamping the reinforcement yarn assembly against said non-threaded front end portion.

4. The assembly as claimed in claim 1, wherein said trailing unit further includes a boot threadedly engaging said rear tube oppositely of said middle tube and configured to be fitted over the fiber core assembly.

5. The assembly as claimed in claim 1, wherein said pulling cap further has a pull ring that is integrally connected to said front closed end wall.

\* \* \* \* \*